United States Patent [19]

Molochnikov et al.

[11] Patent Number: 5,492,716
[45] Date of Patent: Feb. 20, 1996

[54] METHOD OF HARVESTING NATURAL MILK PROTEINS

[75] Inventors: Valery Molochnikov, Stavropol, Russian Federation; Karl-Heinz Zettier, Oelde, Germany

[73] Assignee: Westfalia Separator AG, Oelde, Germany

[21] Appl. No.: 109,800

[22] Filed: Aug. 20, 1993

[30] Foreign Application Priority Data

Aug. 21, 1992 [DE] Germany ............... 42 27 666.7

[51] Int. Cl.$^6$ ............................. A23J 1/20; A23J 3/10
[52] U.S. Cl. ............................................. 426/658
[58] Field of Search ................................... 426/658

[56] References Cited

FOREIGN PATENT DOCUMENTS 0555273  6/1932  Germany .

OTHER PUBLICATIONS

U.S. Pharmacopeia, Jan. 1, 1990, p. 1996.

*Primary Examiner*—Donald E. Czaja
*Assistant Examiner*—Choon P. Koh
*Attorney, Agent, or Firm*—Sprung Horn Kramer & Woods

[57] ABSTRACT

A method of harvesting natural milk proteins by treating a fraction of the milk with a precipitant. The treatment separates the mixture into concentrated natural casein and a fraction that contains the precipitant. The object is to use less polysaccharide. An anionic polysaccharide solution is used as a precipitant. The mixture is separated in a centrifuge into a polysaccharide fraction and a milk fraction. The polysaccharide fraction is exploited to separate the milk fraction into concentrated casein and another polysaccharide fraction.

9 Claims, No Drawings

METHOD OF HARVESTING NATURAL MILK PROTEINS

BACKGROUND OF THE INVENTION

The present invention concerns a method of harvesting natural milk proteins by treating a fraction of the milk with a precipitant. This treatment separates the mixture into concentrated natural casein and a fraction that contains the precipitant.

Dividing milk into three fractions, specifically fat, casein, and whey, by centrifuging is known. Although all constituents of the milk can be considered nutrients, it has been impossible until now to process milk without some form of waste occurring. This situation has resulted in main products and byproducts with to some extent widely divergent physiological value and cost.

German Patent 555 273 suggests adding concentrated pectin to separate the milk into concentrated casein and pectin in whey. This approach made it possible for the first time to obtain a solution of natural casein at a sextuple concentration. The approach was not really successful, however, because it took so much pectin (approximately 250 kg/tonne of casein concentrate) and pectin is expensive. No one has been able to discover a way to exploit the whey that will recover the cost of the pectin.

SUMMARY OF THE INVENTION

The object of the present invention is accordingly a method of harvesting concentrated natural casein with a low fat content that requires only a little precipitant.

This object is attained by using an anionic polysaccharide solution as a precipitant, separating the mixture in a centrifuge into a polysaccharide fraction and a milk fraction, and using the polysaccharide fraction to separate the milk fraction into concentrated casein and another polysaccharide fraction.

Separating the mixture in a centrifuge and exploiting the first polysaccharide fraction saves a lot of polysaccharide. Only 70 to 220 kg of polysaccharide per 1000 kg of dried concentrated milk protein is needed.

Advantageous embodiments of the invention are recited in the subsidiary claims and they will now be specified with reference to the following examples.

DETAILED DESCRIPTION OF THE INVENTION

EXAMPLE 1.

900 kg of non-fat milk or defatted buttermilk are treated with 100 kg of a 7% aqueous solution of pectin, with a 3.7% solution of carboxymethylcellulose, or with a 3.5% solution of Rhodigel-200 (Xanthan Gum). The batch is thoroughly agitated for up to 15 minutes and separated in a high-speed centrifuge into 120 to 130 kg of a solution of natural casein (a protein-lipide concentrate for buttermilk) and approximately 870 to 880 kg of a polysaccharide fraction containing approximately 6.7% solids. The latter can either be processed into food or further concentrated to 33.9% solids, which is 170 kg of concentrated polysaccharide. The concentrated protein is further concentrated in a spray dryer and/or used for food.

The concentrated polysaccharide fraction is used to make food or mixed with 900 kg of non-fat milk or buttermilk and separated in a centrifuge into approximately 120 to 130 kg of concentrated natural casein and 920 kg of another polysaccharide fraction containing 11.7 % solids. The protein is further concentrated in a spray drier and/or used for food. The concentrated polysaccharide obtained from the second polysaccharide fraction is used to make food and/or concentrated to 45 to 50% solids, which is 220 to 230 kg of concentrate. The concentrate is used to make food or mixed with 900 kg of non-fat milk or buttermilk and separated in a centrifuge into approximately 120 to 130 kg of concentrated casein and approximately 980 kg of a third polysaccharide fraction. The concentrated casein and the polysaccharide fraction are dried and/or used to make food. Approximately 400 kg of concentrated milk proteins, including approximately 20% solids, and approximately 980 kg of a polysaccharide fraction with up to 16% solids are accordingly harvested from 2700 kg of non-fat milk or buttermilk or mixtures thereof.

EXAMPLE 2.

900 kg of non-fat milk or concentrated buttermilk containing 24% solids are treated with 100 kg of a 6% solution of pectin, a 12.5 to 2.0% solution of carboxymethylcellulose, and a 1.5 to 2.0% solution of Rhodigel-200 (Xanthan Gum), and thoroughly mixed for up to 15 minutes. The batch is subsequently separated in a high-speed centrifuge into approximately 400 kg of concentrated milk proteins with approximately 31% solids, including 17.5% casein, and approximately 600 kg of a polysaccharide fraction containing approximately 15% solids, including 1.8% whey proteins. The concentrated casein and the polysaccharide fraction are dried and/or used to make food.

What is claimed is:

1. A method of harvesting natural milk proteins comprising treating a fraction of the milk with a precipitant to separate the mixture into concentrated natural casein and a fraction that contains the precipitant by using an anionic polysaccharide solution as a precipitant, separating the mixture in a centrifuge into a polysaccharide fraction and a milk fraction, and centrifuging the polysaccharide fraction to separate the milk fraction into concentrated casein and another polysaccharide fraction.

2. The method as in claim 1, wherein the concentrated polysaccharide accounts for 0.15 to 0.65% of the mixture.

3. The method as in claim 2, wherein the concentrated polysaccharide accounts for 0.3 to 0.6% of the mixture.

4. The method as in claim 1, wherein the first polysaccharide fraction is, before being centrifuged, concentrated at a temperature of 40° to 70° C. to a solids content of 30 to 35%.

5. The method as in claim 1, wherein the second polysaccharide fraction is centrifuged to separate a milk fraction into concentrated casein and a third polysaccharide fraction.

6. The method as in claim 5, wherein the second polysaccharide fraction is, before being centrifuged, concentrated to a solids content of 45 to 50%.

7. The method as in claim 1, wherein the milk fraction is non-fat milk.

8. The method as in claim 1, wherein a concentrated milk fraction is employed.

9. The method as in claim 1, wherein the milk fraction is concentrated buttermilk with a solids content of 15 to 25%.

* * * * *